United States Patent [19]

Peters et al.

[11] Patent Number: 4,500,241

[45] Date of Patent: Feb. 19, 1985

[54] MACHINE FOR MAKING RULED PADS OR THE LIKE

[75] Inventors: Hartmut Peters; Bernd Ramcke, both of Hamburg, Fed. Rep. of Germany

[73] Assignee: E.C.H. Will (GmbH & Co.), Hamburg, Fed. Rep. of Germany

[21] Appl. No.: 418,211

[22] Filed: Sep. 15, 1982

[30] Foreign Application Priority Data

Jan. 28, 1982 [DE] Fed. Rep. of Germany ....... 3202706

[51] Int. Cl.[3] ........................ B42C 9/00; B42C 19/00; B65C 9/06; B65G 29/00

[52] U.S. Cl. ........................................ 412/37; 412/12; 156/567; 198/482

[58] Field of Search ........................ 412/2, 4, 8, 12, 13, 412/16, 32, 37; 51/108 R, 134, 145 R, 145 T; 156/578, 567, 568; 198/339, 482, 580

[56] References Cited

U.S. PATENT DOCUMENTS

| | | | |
|---|---|---|---|
| 1,569,265 | 1/1926 | Clark et al. | 412/12 |
| 3,670,458 | 6/1972 | Faure | 51/108 R |
| 3,672,099 | 6/1972 | Parkhurst | 51/134 |
| 3,793,779 | 2/1974 | Perella | 51/134 |
| 3,974,553 | 8/1976 | Reiger, Jr. et al. | 51/108 R |
| 4,310,366 | 1/1982 | Van Manen | 156/567 |

FOREIGN PATENT DOCUMENTS 2225527 7/1975 Fed. Rep. of Germany .

*Primary Examiner*—Paul A. Bell
*Assistant Examiner*—Paul M. Heyrana, Sr.
*Attorney, Agent, or Firm*—Peter K. Kontler

[57] ABSTRACT

A machine wherein the sheets are held together by adhesive has an indexible turret with radially extending equidistant pockets for reception of stacks of sheets from a feeding device. The pockets transport the stacks past an aligning device, thereupon past an adhesive applying device which coats one edge face of each stack with a layer of adhesive, past a strip applicator which attaches a flexible strip to each adhesive-coated edge face, thereupon past a strip folder which converts each strip into a U-shaped body, and finally to a removing device which removes the thus formed pads from the pockets and transports them in a direction which at least substantially coincides with the direction of delivery of stacks to the pockets. The turret is indexible by steps each of which is a multiple of the distance between the centers of the inlets of two neighboring pockets, and the distance between the feeding and removing device is such that the removing device is bypassed at least once by the stacks and pads in the pockets of the turret to thus ensure that the adhesive can set prior to removal of the pads from their pockets.

25 Claims, 6 Drawing Figures

Fig.4
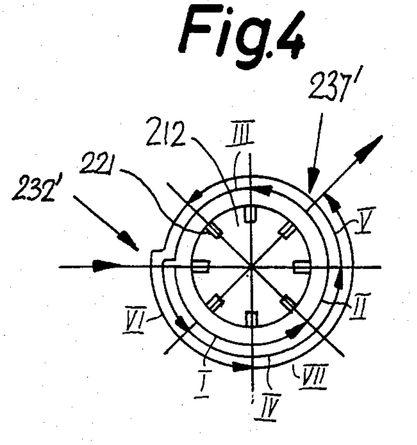
Fig.3
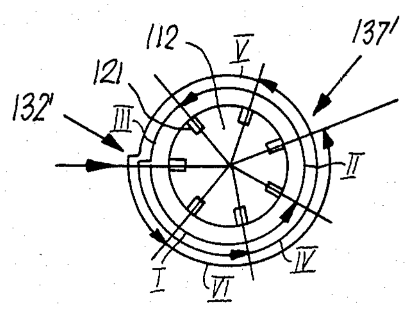
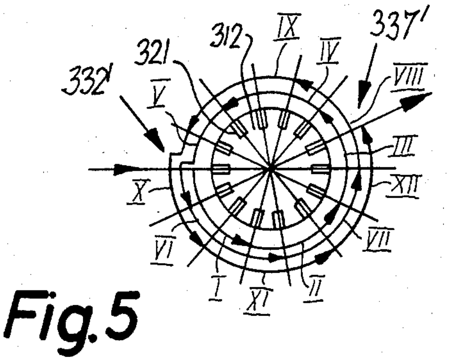
Fig.5

MACHINE FOR MAKING RULED PADS OR THE LIKE

BACKGROUND OF THE INVENTION

The present invention relates to improvements in machines for making steno pads, exercise books and analogous stationery products, and more particularly to improvements in machines for making stationery products (hereinafter called pads for short) wherein the sheets or leaves are held together by a film of adhesive which is applied to one edge face of each pad.

It is already know to convert stacks of overlapping paper sheets into pads by introducing the stacks into the pockets of a circulating conveyor wherein the pockets are equidistant from one another and which is indexed through increments of predetermined magnitude. The conveyor is further equipped with means for releasably holding the stacks in the respective pockets and cooperates with an orienting device which aligns the sheets of successive stacks prior to the application of adhesive, as well as with an adhesive applying device which applies a coat or film of adhesive to each stack which has advanced beyond the aligning device. Suitable feeding means is provided to admit stacks of paper sheets into the pockets of the conveyor at a first station, and a suitable removing means is provided to accept finished pads from the pockets of the conveyor at a second station. Reference may be had to German Pat. No. 22 25 527 which discloses a machine for the making of books consisting of printed forms or the like. However, the same principle can be resorted to in connection with the making of ruled pads or analogous stationery products.

An advantage of the machine which is disclosed in the German patent is that the path of pockets in the circulating conveyor, the stack feeding means and the pad evacuating means are disposed in a common vertical plane. This means that the stacks and the pads are invariably transported in a single direction (meaning in the aforementioned vertical plane) instead of moving from a first vertical plane into another verticsl plane as is customary in certain older types of pad making machines. The placing of the stack feeding means, of the pad removing means and of the circulating conveyor (which transports the stacks during conversion into pads and thereupon transports the pads to the removing means) is desirable and advantageous because such machines take up little room which is particularly important when such a machine is installed in a complete production line wherein webs of paper coming from one or more reels are subdivided into sheets, wherein the sheets are stacked, wherein the stacked sheets are converted into pads, and wherein the pads are stacked prior to insertion into cardboard boxes or the like. For example, it is known to install a pad making machine in a production line wherein a web unwinding unit is followed by an imprinting unit which is followed by a cross cutting unit preceding a sheet overlapping unit which, in turn, precedes a sheet counting and stacking unit. The latter is followed by a cover applying unit which precedes the binder applying unit located ahead of a trimming and severing unit. In such production lines, the placing of the aforeenumerated units one after the other along a straight line is of advantage for a number of reasons, such as the possibility of greatly increasing the output of the production line as a result of a pronounced increase of cycles per unit of time. This is possible because the sheets or stacks of sheets invariably advance in parallelism with their shorter edges, irrespective of whether they are transported along straight or arcuate paths. Such mode of transporting the sheets, stacks and pads allows for operation with relatively short advancing strokes or steps.

Production lines of the above outlined character are used for the making of pads wherein the sheets are held together by spiral binders or the like. The sheet feeding means is disposed substantially diametrically opposite the pad removing means with reference to the axis of the conveyor whose pockets transport stacks away from the feeding means and deliver pads to the removing means. If such teaching is transferred into the field of making pads whose sheets are held together by an adhesive, the conveyor which transports stacks from the feeding means and delivers pads to the removing means is used only to 50 percent of its capacity. On the other hand, a freshly formed pad (i.e., a stack one edge face of which was coated with a film of adhesive) must remain on the conveyor for a certain period of time in order to allow for setting of the adhesive prior to removal of the pad from its pocket. This means that the conveyor must be formed with a very large number of pockets or that the conveyor must be indexed at a relatively low frequency. Consequently, such a conveyor is either too bulky or it constitutes a bottleneck in the production line and necessitates a slowdown of other units with attendant losses in output. In other words, if the conveyor has a relatively small number of pockets, it prevents the operation of other units in the production line at their maximum capacity.

Attempts to overcome the drawbacks of the aforediscussed production line in connection with the making of pads whose sheets are held together by an adhesive include a departure from the straight-line operation, i.e., the stack feeding means and the pad removing means are placed close to one another so that each stack can remain on the conveyor while the latter completes a little less than one full revolution. The pads are removed in a direction substantially at right angles to the direction of advancement of stacks toward the circulating conveyor. As a rule, the stack feeding means is installed at a level directly above the pad removing means so that, if the stacks are fed by moving them along a horizontal path, the removed pads are advanced downwardly along a vertical path. It is also known to feed stacks into the pockets and to remove pads from the pockets at right angles to the plane of orbital movement of the pockets. All such departures from the preferred straight-line concept are resorted to in an effort to prolong the period of dwell of pads in their pockets and to thus allow the adhesive films on the edge faces of the pads to set prior to manipulation of the pads, i.e., prior to removal of pads from their pockets and prior to transport of removed pads to a stacking, trimming, severing or other unit. It has been found that, though the just discussed attempts in fact prolong the periods during which the adhesive films are allowed to set, they invariably contribute to complexity of the machines and reduce the output of such machines below the output of comparable machines whose operation is based on the straightline principle and which utilize spiral binders or the like in lieu of adhesive paste. Moreover, the space requirements of such machines are quite substantial which is especially undesirable when the machines are installed in complete production lines whose space requirements are often enormous so that compactness of individual units is evidently an important advantage.

OBJECTS AND SUMMARY OF THE INVENTION

An object of the invention is to provide a machine for the making of pads wherein the sheets are held together by an adhesive and whose space requirements are but a fraction of the space requirements of heretofore known machines for the mass production of similar products.

Another object of the invention is to provide a machine for making glued pads wherein the stack feeding means can be located at least substantially diametrically opposite the pad removing means with reference to the axis of the conveyor which circulates the stacks and pads on their way from the feeding means to the removing means.

A further object of the invention is to provide a machine wherein the stacks can be fed, wherein the stacks can be converted into pads, and wherein the pads can be removed while moving in a single vertical or nearly vertical plane with attendant savings in space and higher output of the machine.

An additional object of the invention is to provide a machine which provides ample room for the setting of adhesive even though its space requirements are less and its output is higher than that of conventional machines.

Still another object of the invention is to provide a novel and improved conveyor for use in a machine of the above outlined character.

A further object of the invention is to provide novel and improved means for indexing the conveyor.

An additional object of the invention is to provide novel and improved means for treating stacks and pads while such commodities are held in the pockets of a circulating conveyor.

A further object of the invention is to provide a novel and improved method of making pads wherein the sheets are held together by a film of adhesive.

Another object of the invention is to provide a novel and improved method of converting stacks of overlapping paper sheets or the like into glued pads in a small area and at a frequency which cannot be achieved by resort to conventional methods.

The invention is embodied in a machine for converting stacks of overlapping sheets into pads wherein the sheets are held together by an adhesive which is applied to one edge face of each stack. The machine comprises an indexible conveyor (e.g., a turret which is rotatable about a preferably horizontal axis) including a predetermined number of stack receiving means (preferably in the form of pockets which extend radially of the aforementioned turret and whose radially outermost portions constitute inlets for admission of stacks of overlapping sheets) arranged to orbit in a predetermined direction along a predetermined (e.g., circular) path, indexing means which is operable to rotate the conveyor by equal steps each of which is a whole multiple of the distance a between the centers of the inlets of two neighboring receiving means, stack feeding means having an endless conveyor or other suitable means for advancing stacks of sheets in a given direction (e.g., along a horizontal platform) toward a first portion of the path and into empty receiving means of the conveyor while the indexing means is idle between two successive operations, treating means adjacent to the path and arranged to convert stacks in the receiving means into pads whose sheets are held together by an adhesive, and pad removing means having an endless conveyor or other suitable means for advancing pads from filled receiving means of the conveyor in a second portion of the path and in a direction which preferably at least substantially corresponds to the aforementioned given direction (of advancement of stacks into the first portion of the path). The distance between the first and second portions of the path (as considered in the predetermined direction) departs from a whole multiple of one of the steps, and the total number of receiving means is divisible with a rest by the number representing the whole multiple of distances covered by one of the steps. For example, the conveyor can be provided with twenty-three receiving means, the distance between the first and second portions of the path (i.e., between the stack receiving means and the pad removing means, as considered in the direction of rotation of the conveyor) can equal 11*a*, and each step of the conveyor can equal 2*a*. This ensures that each receiving means which contains a stack bypasses the pad removing means during first transport of a stack past the pad removing means, i.e., each stack completes more than a single revolution about the axis of rotation of the conveyor.

The machine preferably further comprises pairs of jaws or other suitable means for releasably holding stacks of sheets in the receiving means of the indexible conveyor.

The treating means preferably includes means for aligning the sheets of each stack prior to the application of adhesive to an edge face of such stack.

The conveyor can have an odd number of receiving means and each of its steps can equal 2*a* or 3*a* (wherein a is the aforementioned distance between the centers of the inlets of two neighboring receiving means). However, it is also possible to provide the conveyor with an even number of receiving means; each step of the conveyor then equals x times a wherein x is an odd number or any number which is selected in such a way that the total number of receiving means is not a whole multiple of x. This ensures that each stack completes more than one revolution about the axis of the conveyor.

At least one treating device of the treating means is preferably disposed downstream of the second portion but upstream of the first portion of the path, as considered in the direction of rotation of the indexible conveyor. The aforementioned aligning device and/or another treating device can be installed downstream of the first portion but upstream of the second portion of the path. Such treating device or devices are preferably mounted at a level below the stack feeding means.

The adhesive applying device of the treating means can be disposed downstream of the second portion but upstream of the first portion of the path, as considered in the direction of rotation of the indexible conveyor, preferably at a level above the pad removing means. The adhesive applying device can comprise a roller or other suitable means for coating one edge face of each stack of aligned sheets with a layer or film of a suitable adhesive, and such device can be followed by a treating device which applies so-called back strips (consisting of paper or other flexible material) to the adhesive-coated edge faces of the stacks. For example, the strip applying device can be disposed downstream of the adhesive applying device but upstream of the stack feeding means, as considered in the direction of rotation of the indexible conveyor. The strip applying device can be followed by a strip folding device which converts each back strip into a substantially U-shaped body overlying the adhesive-coated edge face as well as portions of the front and rear sides of the respective pad. The folding device of the treating means can be installed downsteam of the strip applying device but upstream of the stack feeding means. Such devices, as well as the adhesive applying device, can be located downstream of the pad removing means, i.e., in a region wherein a conventional machine merely transports empty receiving means toward the stack feeding means.

Each of the aforementioned holding means can comprise a stationary and a mobile gripping jaw for the stack of sheets in the respective receiving means. Such holding means can be deactivated during transport of stacks past the aforementioned aligning device of the treating means. The stack feeding and the pad receiving means can be disposed at different levels, but the aforementioned first and second portions of the path of orbital movement of inlets of the receiving means can still be located substantially diametrically opposite one another with reference to the axis of rotation of the indexible conveyor.

The pad removing means can be associated with or can include means for transporting finished pads from the receiving means in the second portion of the path. Such transferring means can comprise a ram serving to partially expel pads from their receiving means and a tongs or analogous means for transferring partially expelled pads from their receiving means onto or into the range of the aforementioned advancing means of the pad removing means.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a diagrammatic elevational view of a modified machine wherein the turret comprises seven pockets and each stack completes six steps prior to removal of the resulting pad from the turret;

FIG. 4 is a similar diagrammatic elevational view of a machine wherein the turret comprises an even number of pockets; and FIG. 5 is a similar diagrammatic elevational view of a further machine.

DESCRIPTION OF THE PREFERRED EMBODIMENTS

Figures 1A, 1B:
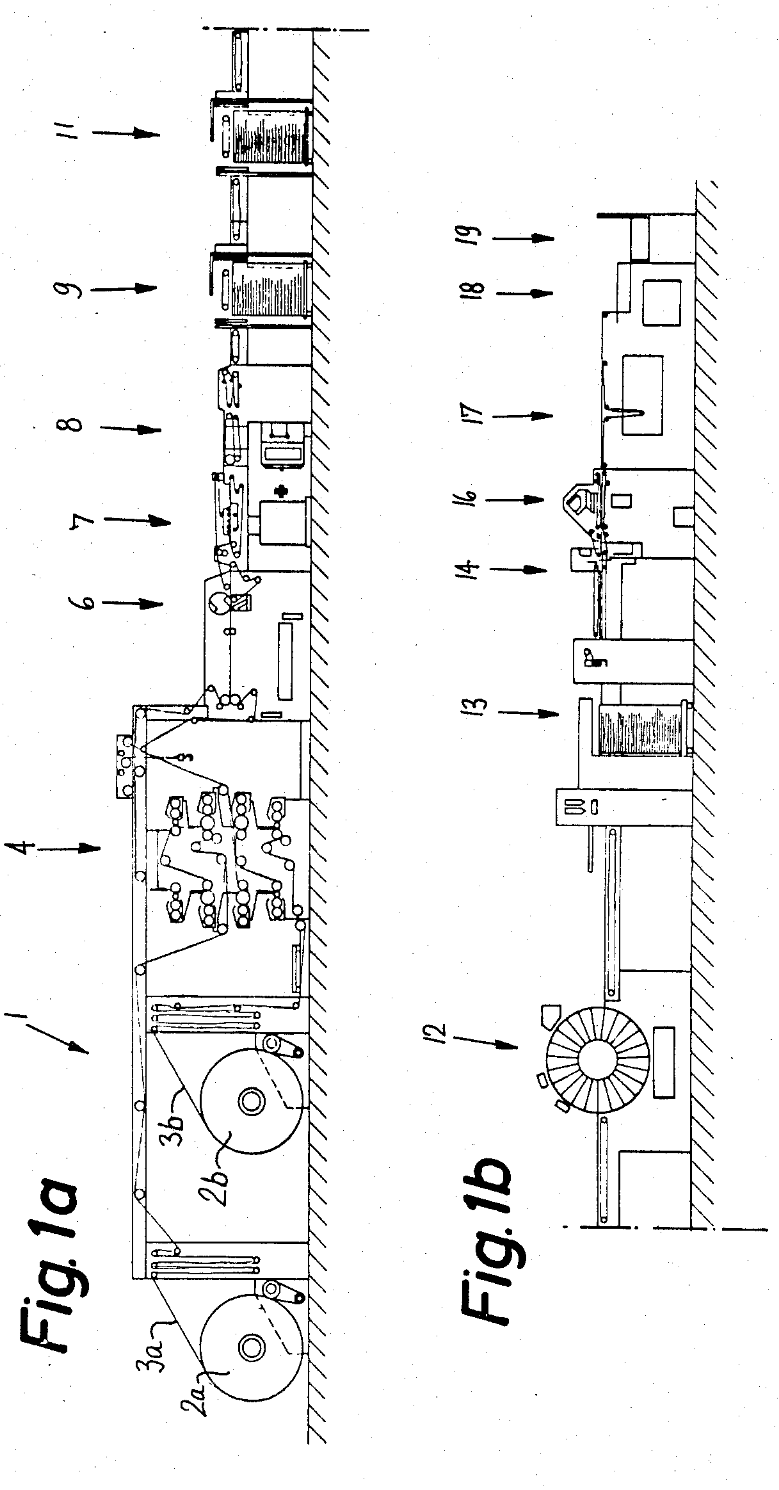
FIG. 1*a* is a schematic elevational view of a portion of a production line which utilizes the machine of the present invention.
FIG. 1*b* is a similar schematic elevational view of the remaining portion of the production line.

Referring first to FIGS. 1*a* and 1*b*, there is shown a production line which is used for the mass production of stationery products (hereinafter called pads) whose leaves or sheets are held together by films or adhesive which is applied to one edge face of each pad. As considered in a direction from the left to the right in FIGS. 1*a* and 1*b*, the production line comprises the following constituents or units: A web feeding unit 1 with two reels 2*a* and 2*b* of convoluted paper web stock respectively storing paper webs 3*a* and 3*b* and rotatable in a clockwise direction, as viewed in FIG. 1*a*, to pay out the respective webs in a direction to the right. The unit 1 is followed by an imprinting unit or tower 4 wherein both sides of each of the webs 3*a*, 3*b* are provided with printed matter (e.g., with parallel lines if the ultimate products are to constitute ruled pads). The imprinting unit 4 is followed by a cross cutting unit 6 which receives the webs 3*a* and 3*b* in such a way that the web 3*a* overlies the web 3*b* and which includes means for subdividing the leaders of the webs 3*a*, 3*b* into sheets of predetermined length, as considered in the direction of transport of the webs 3*a*, 3*b* and sheets from the cross cutting unit 6 toward the next-following unit 7. The latter constitutes a scalloping or overlapping unit wherein successive pairs of overlapping sheets are braked for predetermined intervals of time so that each next-following pair of sheets partially overlaps the preceding pair of sheets, i.e., the unit 7 converts a series of successive pairs of sheets into a scalloped stream wherein the extent of partial overlap of preceding pairs of sheets by the next following pairs of sheets depends on the selected braking action of instrumentalities in the unit 7.

The unit 7 is followed by a combined counting and gathering unit 8 which accumulates discrete stacks each containing a predetermined number of accurately overlapping sheets. For example, the unit 8 may be constructed and assembled in a manner as disclosed in the commonly owned U.S. Pat. No. 4,297,066 granted Oct. 27, 1981 to Bernd Ramcke et al.

The unit 8 is followed by a cover applicator unit 9 and an insert introducing unit 11. For example, the unit 9 can apply a cover below and a cover on top of each discrete stack which is assembled in the unit 8, and the unit 11 can insert into each such stack one or more inserts consisting of cardboard or the like to constitute partitions in the finished pads. It is also possible to place the unit 11 ahead of the unit 9, as considered in the direction of transport of stacks through the production line.

The next unit is an indexible turret-like conveyor 12 (hereinafter called turret for short) which receives and transports the stacks 23 (see FIG. 2) of overlapping sheets past a series of treating devices which are adjacent to the path of orbital movement of stacks 23 about the horizontal axis of the turret.

The turret 12 is followed by a unit 13 which is used for the application of so-called flap-over covers and is equipped or associated with suitable grooving or scoring means. The unit 13 is followed by a trimming unit 14 having means for trimming those edge faces of successive pads 23' (FIG. 2) which are located opposite the adhesive-coated edge faces. The unit 14, in turn, is followed by a second trimming unit 16 which trims the remaining edge faces of the pads and, if necessary, subdivides each pad 23' into two or more narrower pads. The next unit (17) is an inverting unit which turns, upside down, each second pad of the series, e.g., in a manner as disclosed in U.S. Pat. No. 4,268,200 granted May 19, 1981 to Paul Fabrig. The unit 17 is followed by a combined counting and stacking unit 18 which assembles groups consisting of predetermined numbers of stacked pads and is followed by a removing unit 19 which transports stacked pads into storage, into an apparatus wherein the stacks of pads are inserted into cardboard cartons or other types of receptacles, or to another destination. Reference may be had to commonly owned U.S. Pat. No. 4,249,844 granted Feb. 10, 1981 to Siegfried Lampe et al.

The production line of FIGS. 1*a* and 1*b* further comprises a plurality of transporting means in the form of endless smooth or toothed belts or chains provided with pushers or other types of entraining elements, transporting fingers of the type often wemployed for advancement of individual or stacked sheets, and/or others. Such transporting means are used to transport sheets or groups of sheets between successive units as well as for the transport of sheets or groups of sheets in various units. Numerous transporting devices are shown but not specifically identified in FIGS. 1*a* and 1*b* because their exact construction forms no part of the present invention. The invention is concerned with that unit of the aforedescribed production line which includes the turret 12 and the treating devices which are adjacent to the path of movement of stacks 23 with the turret. The invention is also concerned with the means for feeding stacks 23 of sheets to successive receiving means or pockets 21 of the turret 12, as well as with means for removing pads 23' from the pockets and for advancing the pads to the next unit, i.e., to the unit 13 for the application of flap-over covers. Still further, the invention relates to the indexing means for the turret 12.

Figure 2:
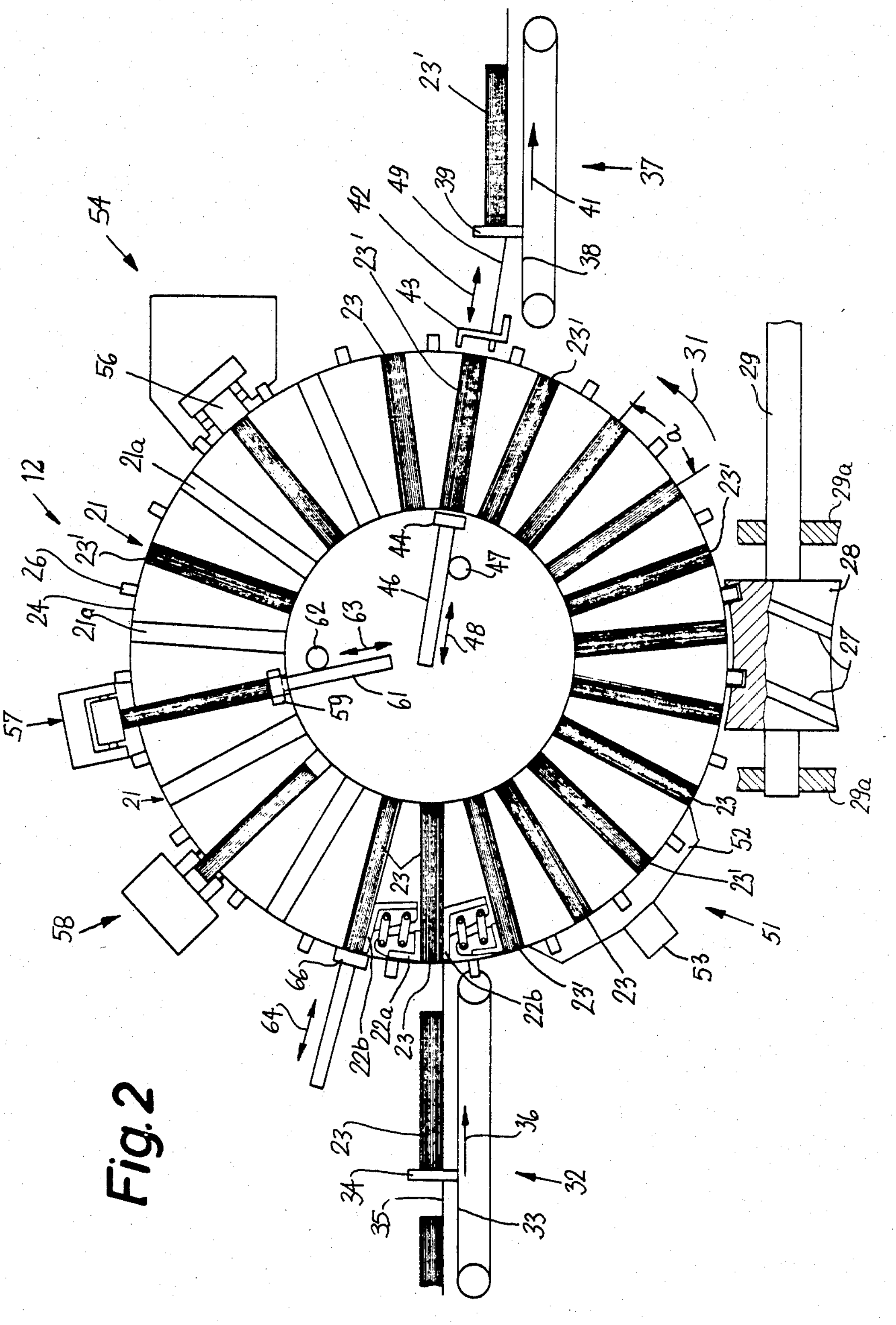
FIG. 2 is a greatly enlarged elevational view of a machine which embodies the invention.

FIG. 2 shows that the turret 12 comprises an odd number (twenty-three) of receiving means or pockets 21 for discrete stacks 23 of overlapping sheets. Each such pocket 21 is a slot which extends substantially or exactly radially of the turret 12. The distance or spacing a between the centers of the radially outermost portions or inlets 21*a* of neighboring pockets 21 is identical, and the inlet 21*a* of each pocket 21 is flanked by a stack retaining or holding means including a first gripping jaw 22*a* which can be fixedly mounted on the turret 12 and a mobile second gripping jaw 22*b* which can be displaced with reference to the associated jaw 22*a* so as to respectively hold or release a stack 23 containing a predetermined number of overlapping paper sheets. Such retaining or holding means are known per se in the paper processing industries, for example, in machines which are used to provide pads with spiral binders or the like. Reference may be had to U.S. Pat. No. 4,232,858 granted Nov. 11, 1980 to Paul Fabrig. Furthermore, such holding or retaining means are also used in conventional machines for making pads wherein the sheets are held together by a coating of adhesive which is applied to a selected edge face of the respective stack of overlapping sheets. Therefore, the exact details of the means for moving the mobile jaws 22*b* with reference to the fixedly mounted jaws 22*a* are not specifically shown in the drawing. Reference may be had to a host of U.S. and other patents which fully disclose such types of holding or retaining means. It suffices to say here that the jaws 22*a*, 22*b* at the inlet 21*a* of each pocket 21 can cooperate to temporarily hold a stack 23 or a pad 23' in the corresponding pocket 21 while the stack or pad is treated by the devices which are installed adjacent to the path or orbital movement of inlets 21*a* about the horizontal axis of the turret 12.

The inlets 21*a* of the pockets 21 alternate with equidistant motion receiving projections or teeth 26 which extend beyond the peripheral surface of a disc-shaped carrier 24 rotating with and being coaxial with the turret 12. The carrier 24 and its projections or teeth 26 form part of the means for indexing the turret 12 at predetermined intervals and through predetermined angles. The indexing means further comprises a worm 28 having a helical groove 27 which receives successive projections 26 when the worm shaft 29 is rotated by the main prime mover of the production line, e.g., by a variable-speed electric motor through the medium of a geneva movement or a like mechanism which can convert continuous rotary movements of a first shaft into intermittent angular movements of the worm shaft 29. The latter is rotatably journalled in members 29*a* of the frame for the turret 12. The projections 26 can constitute rollers or wheels which are rotatable about axes extending radially of the turret 12 and carrier 24.

In the illustrated embodiment, the angles through which the turret 12 is indexed when the shaft 29 is set in rotary motion are such that the turret is indexed through two distances a, i.e., by steps corresponding to twice the spacing between the centers on inlets 21*a* of two neighboring pockets 21. The (predetermined) direction in which the turret 12 is indexed is indicated by the arrow 31.

The means 32 for feeding stacks 23 of superimposed sheets to selected pockets 21 of the indexible turret 12 is installed at the nine o'clock position, of the turret 12 and carrier 24, as viewed in FIG. 2, and comprises an advancing means here shown as an endless belt or chain conveyor 33 which is intermittently driven in the (given) direction of arrow 36 and has an outwardly extending entraining element or pusher 34 which can engage the trailing edge of a stack 23 above the upper reach of the conveyor 33 to introduce such stack into the registering pocket 21 of the turret 12 while the turret is at a standstill. The illustrated feeding means 32 is constructed and assembled in such a way that the pusher 34 of the conveyor 33 can advance successive stacks 23 along the upper side of a stationary horizontal platform or guide 35 which is suitably slotted to permit the pusher 34 to rise behind the foremost stack 23, to advance such stack toward and into the registering pocket 21 while advancing with the upper reach of the conveyor 33, and to thereupon descend to a level below the platform 35 on its way with the lower reach of the conveyor 33 and toward engagement with the trailing edge of the next stack 23 on the platform 35. The manner in which the stacks 23 are advanced along the platform 35 into the range of the pusher 34 is not specifically shown in the drawing. The conveyor 33 can be driven stepwise or continuously, for example, only during the intervals when the turret 12 is at a standstill and maintains an empty pocket 21 in accurate alignment with the foremost stack 23 on the platform 35.

The means 37 for removing pads 23' from selected pockets 21 of the indexible turret 12 is installed at or close to the $3\frac{1}{2}$ o'clock position of the parts 12 and 24 and comprises an advancing means in the form of an endless chain or belt conveyor 38 having an outwardly extending entraining element or pusher 39 which advances a pad 23' in the direction of arrow 41 during movement with the upper reach of the conveyor 38. The means for intermittently driving the conveyor 38 is not specifically shown in the drawing. The receiving (left-hand) end of the conveyor 38 is spaced apart from the turret 12 and carrier 24 to provide room for a transfer unit here shown as including a tongs 43 at least a portion of which is movable back and forth in directions indicated by a double-headed arrow 42 and which is designed to open and close in selected positions and for selected intervals of time in order to withdraw pads 23' from the adjacent pockets 21 and to transfer the thus withdrawn pads onto a suitably sloping portion of a second platform or guide 49 along which the pads 23' are advanced in the direction of arrow 41 by the pusher 39 to reach the next unit 13 of the production line shown in FIGS. 1*a* and 1*b*. The tongs 43 cooperates with a reciprocable ram 44 which is installed in the interior of the turret 12 (namely, radially inwardly of the path of movement of the open inner ends of the pockets 21) and whose shank 46 is movable in directions indicated by a double-headed arrow 48 to expel a pad 23' from the adjacent pocket 21 and into the range of the tongs 43 when the shank 46 is caused to move in a direction to the right, as viewed in FIG. 2. A portion of the shank 46 can constitute a toothed rack which is in mesh with a gear 47 serving to move the ram 44 back and forth between the retracted position of FIG. 2 and an extended position in which the ram maintains the radially outermost portion of a pad 23' in the range of the tongs 43. The arrangement is such that the ram 44 performs a forward and return stroke during each interval of dwell of the turret 12, i.e., a pad 23' is expelled from its pocket 21 to advance into the range of the (then open) tongs 43 whenever the worm shaft 29 is brought to a standstill. The direction which is indicated by the arrow 41 coincides, at least substantially, with that (given) direction which is indicated by the arrow 36.

The treating devices which are adjacent to the path of movement of stacks 23 and pads 23' with the turret 12 include an orienting or aligning device 51 which is immediately adjacent to and located downstream of the feeding means 32, as considered in the direction of arrow 31. The orienting device 51 is located upstream of the removing means 37 at a level below the feeding means 32 and comprises stationary guide elements 52 which are suitably curved so as to conform to the path of movement of inlets 21*a* of the pockets 21. The guide elements 52 are operatively connected with an electromechanical vibrator 53 which imparts to the guide elements vibratory movements at an optimum frequency. The mobile jaw 22*b* of the holding means for the stack 23 which is caused to advance past the guide elements 52 of the orienting device 51 is moved to open position so that the sheets of a stack 23 in the pocket 21 advancing past the device 51 are not clamped but abut (with their outer edges) against the adjacent concave surfaces of the elements 52 to ensure that the outer edges of all sheets in a stack 23 which has advanced beyond the device 51 are accurately aligned with each other and together form a smooth edge face which can be properly coated with one or more films or coats of adhesive. The jaws 22*b* return to their clamping positions before the oriented or aligned sheets of the stacks 23 move beyond the guide elements 52 to thus ensure that the oriented or aligned sheets of such stacks cannot move with reference to one another, at least not in the regions of their radially outermost portions.

The removing means 37 is located upstream (as considered in the direction of arrow 31) of a second treating device constituting an adhesive applying device 54 including a roller-shaped applicator 56 movable back and forth at right angles to the plane of FIG. 2 to coat the outer edge faces of adjacent stacks 23 with a film or coat of a suitable adhesive. The axis of the roller-shaped applicator 56 is substantially tangential to the turret 12 and carrier 24.

The adhesive applying device 54 is located upstream of a further treating device constituting a back strip applicator 57. The latter attaches to the adhesive-coated edge faces of adjacent stacks 23 strips of paper or the like to thus convert the stacks 23 into pads 23'. The applicator 57 is followed (again as considered in the direction of arrow 31) by a treating device which constitutes a folding device 58 serving to convert each back strip into a U-shaped body which straddles the adhesive coated edge face of the adjacent pad 23' as well as the adjacent portions of the two outer sides of such pad.

In order to enable the treating devices 57 and 58 to carry out their aforedescribed operations (i.e., the application of strips and the folding of applied strips to convert them into substantially U-shaped bodies), the structure which is shown in FIG. 2 further comprises a further treating device constituting a reciprocable ram 59 which is movable into the open inner end of the adjacent pocket 21 and is retractible from such inner end into the space within the confines of the turret 12. The shank 61 of the ram 59 can constitute a toothed rack in mesh with a gear 62 which is rotatable back and forth to reciprocate the ram 59 in directions indicated by a double-headed arrow 63. The mobile jaw 22*b* of the holding or retaining means for that pocket 21 which is in register with the strip-applying device 57 is moved to open position so that, when the ram 59 is introduced into the open inner end of such pocket 21, the respective pad 23' moves radially outwardly and contacts the innermost strip in the device 57. The turret 12 thereupon advances the thus shifted stack 23 (which is converted into a pad 23' not later than as a result of the application of a strip thereto) toward and into register with the device 58 which folds the longitudinally extending marginal portions of the strip over the respective (front and rear) sides of the pad 23'.

A pad 23' which advances (in its pocket 21) beyond the folding device 58 moves into the range of a reintroducing device or plunger 66 which is reciprocable in directions indicated by a double-headed arrow 64 and serves to return the radially outermost portion of the adjacent pad 23' (with a folded strip thereon) into the respective pocket 21.

As mentioned above, the turret 12 comprises an uneven or odd number (23) of pockets 21. Also, the turret 12 is indexed through distances each of which equals 2*a*. The distance between the feeding means 32 and the removing means 37, as considered in the direction of arrow 31, equals 11*a*. The distance between the feeding means 32 and the adhesive applying device 54 (again as considered in the direction of arrow 31) equals 14*a*. The distance between the device 54 and the strip applying device 57 equals 4*a*, the distance between the device 57 and the folding device 58 equals 2*a*, and the distance between the device 58 and the plunger 66 also equals 2*a*.

The operation of the structure which is shown in FIG. 2 is as follows:

The feeding means 32 delivers successive stacks 23 into the adjacent pocket 21 of the turret 12 while the latter is idle between successive indexing movements in the direction of arrow 31. As mentioned above, the worm 28 rotates the turret 12 in stepwise fashion (via carrier 24) through increments corresponding to the distance 2*a* (twice the spacing between the centers of the inlets 21*a* of two neighboring pockets 21). The mobile jaws 22*b* at the inlets 21*a* of the pockets 21 which are located at the concave sides of the guide elements 52 of the orienting or aligning device 51 are held in their retracted or inoperative positions so that the vibrator 53 can cause the elements 52 to shift the outer edges of all sheets in the stacks 23 advancing past the elements 52 into accurate alignment with one another so that, in their entirety, such edges constitute a flat edge face which is ready to be coated with a film of adhesive. The jaws 22*b* thereupon reassume their operative positions and hold the sheets of the respective stacks 23 against shifting relative to one another during transport of such stacks (in stepwise fashion) past and beyond the removing means 37 and into the range of the adhesive applying device 54. In other words, the stacks 23 whose sheets are oriented or aligned by the device 51 bypass the removing means 37 during movement of the respective pockets 21 through the space between the ram 44 and the tongs 43. This is due to the fact that the distance between the feeding means 32 and the removing means 37 equals 11*a* whereas each step of the turret 12 equals 2*a*.

The stacks 23 which were treated by the orienting device 51 are thereupon coated with adhesive by the roller 56 of the adhesive applying device 54, and the thus coated stacks 23 then advance into range of the strip applying device 57 after the turret 12 completes two further steps (distance 4*a*). The strip is converted into a U-shaped body after the turret 12 completes a further angular movement through a distance 2*a* so as to move the respective pocket 21 into register with the folding device 58. As explained above, the ram 59 penetrates into the open inner end of the pocket 21 which registers with the device 57 to expel the outermost portion of the pad 23' therein, and the pad then remains in such partially expelled position during travel toward and into register with the device 58. The device 66 thereupon reinserts the outermost portion of the pad 23' into the respective pocket 21 after the turret 12 completes a step to move the pad 23' from the device 57 in a direction toward the feeding means 32. Such pad 23' bypasses the feeding means 32 while the turret 12 is indexed again. The indexing continues until the pad 23' reaches the removing means 37 where it is transferred onto the platform 49 with assistance from the ram 44 and tongs 43. The pusher 39 of the conveyor 38 advances the freshly removed pad 23' along the platform 49 and into the range of a transporting mechanism which introduces the pad 23' into the unit 13 shown in FIG. 6. It will be noted that each stack 23, or the corresponding pad 23', shares more than one revolution of the turret 12, namely such stack or pad advances from the feeding means 32, past the removing means 37, past the feeding means 32, and again to the removing means 37 to be transferred from its pocket 21 by the parts 43 and 44.

An important advantage of the machine which is shown in FIG. 2 is that each stack 23 whose outer edge face carries a film of adhesive remains in its pocket 21 for an interval of time which is amply sufficient to ensure adequate setting of adhesive prior to removal of the corresponding pad 23', i.e., prior to transfer of such pad onto the platform 49 of the removing means 37. This is due to the fact that the number of distances a between the feeding means 32 and the removing means 37 (as considered in the direction of arrow 31) is divisible with a rest by the number (two) of distances a which the inlets 21*a* of the pockets 21 cover during each step of the turret 12. In other words, the number of distances a between the feeding means 32 and the removing means 37 is not a whole multiple of 2*a* (a step performed by the turret 12).

Another important advantage of the improved machine is that the direction (arrow 36) in which the conveyor 33 of the stack feeding means 32 advances stacks 23 toward a first portion of the endless path defined by the inlets 21*a* of the pockets 21 is at least substantially parallel and preferably at least substantially coincides with the direction (arrow 41) in which the conveyor 38 of the removing means 37 advances pads 23' from a second portion of the aforementioned endless path. The turret 12, the stack feeding means 32 and the pad removing means 37 are located in a common vertical plane (the turret 12 is indexed about a horizontal axis), and the stack feeding means 32 is located substantially diametrically opposite the pad removing means 37 with reference to the axis of the turret.

In the embodiment of FIG. 2, the stacks 23 which are admitted by the conveyor 33 are removed from the corresponding pockets 21 after less than two full revolutions about the axis of the turret 12. However, and as will be explained with reference to FIGS. 3 to 5, it is equally possible to retain the stacks on the turret while the respective pockets complete two or more revolutions. The improved machine is designed with a view to take advantage of the space which is adjacent to the path of movement of pockets 21 from the pad removing means 37 back to the stack feeding means 32, i.e., to render it possible to place one or more treating devices downstream of the pad removing means 37 but upstream of the stack feeding means 32 (as considered in the direction of arrow 31). In other words, the improved machine provides for setting of the adhesive on the outer edge faces of pads 23' in those pockets 21 of the turret 12 which advance beyond the pad removing means 37, i.e., in those pockets which are invariably empty in conventional machines. Such design of the improved machine further allows for utilization of treating devices which must be located downstream of the turret in a conventional pad making machine because the space downstream of the stack feeding means but upstream of the pad removing means in a conventional machine simply does not suffice to accommodate a substantial number of treating devices.

The machine which is shown in FIG. 2 exhibits the additional advantage that the steps which are performed by the turret 12 during each indexing movement are relatively small, i.e., the smallest whole multiple of the distance a between the centers of the inlets 21*a* of two neighboring pockets 21. This reduces numerous problems in connection with acceleration and deceleration of the turret 12 and of the parts which share the angular movements of the turret. The advantage of relatively small steps will be readily appreciated since the magnitude of accelerating and decelerating forces acting upon the turret 12 depends primarily on two factors, namely, the mass of the turret and the length of each of its steps in response to activation of the indexing means including the parts 24 and 26 to 29. However, it has been found that, if the mass of the turret is relatively small (note turret 112 of FIG. 3), the steps to be performed by the turret can be readily increased to 3*a* or even further.

As mentioned above, a conventional machine does not accommodate any treating devices in the space downstream of the pad removing means but upstream of the stack feeding means. In the apparatus of FIG. 2, such space accommodates several treating devices, namely, the adhesive applying device 54, the back strip applying device 57, the back strip folding device 58, and the plunger 66. This is possible because the pockets 21 which advance from the pad removing means 37 toward the stack feeding means 32 are not empty but contain stacks 23 (between the pad removing means 37 and the adhesive applying device 54) as well as pads 23' (between the device 54 and the stack feeding means 32). This contributes to compactness of the machine because the treating devices can be installed practically all the way around the path of movement of inlets 21*a* of the pockets 21.

The aforementioned German Pat. No. 22 25 527 discloses a sheet aligning or orienting device which is located upstream of the stack feeding means, i.e., which is not adjacent to the indexible conveyor of the patented machine. This creates problems because the positions of sheets in successive stacks cannot be changed during transport from the aligning device into the pockets of the conveyor, i.e., the stack feeding means must be designed to prevent any shifting of sheets in the stacks which are being fed thereby. Such problems are overcome in the improved apparatus by the novel expedient of placing the aligning device 51 downstream of the stack feeding means 32 and upstream of the adhesive applying device 54, most preferably upstream of the pad removing means 37 (as considered in the direction of arrow 31). This contributes to simplicity of the aligning device 51 because it can be placed at a level below the stack feeding means so that the sheets of a stack 23 which advances past the guide elements 52 tend to slide radially outwardly and to move their outer edges into accurate alignment with one another. The vibrator 53 merely ensures that each and every sheet of a stack 23 in the range of the aligning device 51 will move its outer edge into actual contact with the concave inner sides of the guide elements 52. Thus, the aligning device 51 merely includes one or more stationary guide elements 52 and a simple vibrator for such guide element or elements. The concave inner sides of the guide elements 52 conform to the curvature of the path of movement of inlets 21*a* about the horizontal axis of the turret 12.

The placing of the adhesive applying device 54 at a considerable distance from and downstream of the aligning device 51 (as considered in the direction of arrow 31) is advisable and advantageous if the treating means of the improved machine further comprises a milling device or other suitable means for roughening the outer edge faces of stacks 23 which advance from the aligning device 51 toward the adhesive applying device 54. Such roughening of edge faces which are about to be coated with films of adhesive is often desirable and advantageous in order to promote the adherence of adhesive films to the respective edge faces. The roughening device can be omitted if the knives of the cross cutting unit 6 shown in FIG. 1*a* are designed to provide the sheets (which are obtained in response to severing of the webs 3*a* and 3*b*) with so-called deckle edges. If a milling or other roughening device is used in the machine of the present invention, it can be installed at a level below the stack feeding means 32 and pad removing means 37 or between the pad removing means 37 and the adhesive applying device 54 (as considered in the direction of arrow 31). The placing of roughening means at a considerable distance from the adhesive applying device 54 (e.g., close to but downstream of the aligning device 51) is normally advisable and advantageous because this reduces the likelihood of contamination of adhesive by the fragments of paper or cardboard which are removed by the roughening device. It has been found that the distance between the adhesive applying and roughening devices is sufficiently large if the roughening device is installed at a level below and upstream of the pad removing means 37 while the adhesive applying device 54 is mounted in the illustrated position, i.e., at a level above and downstream of the pad removing means 37.

The improved machine contributes significantly to compactness of the production line. This is attributable to the fact that the machine can accommodate, in a small area, a substantial number of stack or pad treating devices which (if provided at all) must be installed downstream of the pad removing means of a conventional machine. This applies, for example, to the back strip applying device 57 and the back strip folding device 58 of FIG. 2. It has been found that there is ample room for the devices 57 and 58 in the region downstream of the adhesive applying device 54 but upstream of the stack feeding means 32.

FIG. 3 illustrates a modified machine with a turret 112 having seven pockets 121, with stack feeding means 132' at the nine o'clock position of the turret 112, and with pad removing means 137' at or close to the two o'clock position of the turret, i.e., the angular spacing between the means 132' and 137' equals four times the distance between the centers of two neighboring pockets 121. The turret 112 is indexible through angles corresponding to three times the distance between the centers of the inlets of two neighboring pockets 121. The first step I of the turret 112, after insertion of a stack into the pocket 112 in the region of the feeding means 132', takes such pocket to a position upstream of the removing means 137', the second step II past the removing means 137' and close to but still upstream of the feeding means 132', the third step III to a position midway between the feeding means 132' and the removing means 137', the fourth step IV again past the removing means 137', the fifth step V past the feeding means 132', and the sixth step VI into register with the removing means 137'. It goes without saying that the number of pockets 121 in the turret 112 can (and in actual practice does) greatly exceed the number of pockets which are shown in FIG. 3. Also, the angular spacing between the feeding means 132' and the removing means 137' can be changed in a number of ways (i.e., slightly increased or reduced) without departing from the spirit of the invention. The same holds true for the embodiments of FIGS. 4 and 5. It is impossible to increase the steps of the turret so that the distance which a pocket covers during indexing of the turret is more than three times the distance between the centers of inlets of two neighboring pockets. It is presently preferred not to index the turret through relatively large angles because this necessitates pronounced acceleration and pronounced deceleration of the turret during each indexing movement with attendant increased cost of the indexing means and the need for appropriate braking means, etc.

FIG. 4 shows a turret 212 with an even number (eight) of pockets 221. The distance between the stack feeding means 232' and the pad removing means 237' equals five times the distance between the centers of inlets of two neighboring pockets 221. The stack which is admitted by the feeding means 232' into a pocket 221, while the turret 212 is idle, completes seven steps (I to VII) prior to removal of the resulting pad by the means 237'.

Referring finally to FIG. 5, there is shown a turret 312 with an even number (fourteen) of pockets 321. The distance between the stack feeding means 332' and the pad removing means 337' equals eight times the distance between the centers of inlets of two neighboring pockets 321. Each stack completes a total of twelve steps I to XII prior to removal of the resulting pad by the means 337'.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A machine for converting stacks of overlapping sheets into pads wherein the sheets are held together by an adhesive which is applied to one edge face of each stack, comprising an indexible conveyor including a predetermined number of equidistant stack receiving means having inlets and arranged to orbit in a predetermined direction along a predetermined path; indexing means operable to rotate said conveyor by equal steps each of which is a whole multiple of the distance between the centers of the inlets of two neighboring receiving means; stack feeding means having means for advancing stacks of sheets in a given direction toward a first portion of said path and into empty receiving means of said conveyor while said indexing means is idle between successive operations thereof; treating means adjacent to said path and arranged to convert stacks in said receiving means into pads whose sheets are held together by an adhesive; and pad removing means having means for advancing pads from filled receiving means of said conveyor in a second portion of said path and in a direction at least substantially corresponding to said given direction, the distance between said first and second portions of said path, as considered in said predetermined direction, not being a whole multiple of one of said steps and the total number of said receiving means being divisible with a rest by the number representing said whole multiple of distances covered by one of said steps.

2. The machine of claim 1, further comprising means for releasably holding stacks of sheets in the receiving means of said conveyor.

3. The machine of claim 1, wherein said treating means comprises means for aligning the sheets of each stack prior to the application of adhesive to an edge face of such stack.

4. The machine of claim 1, wherein said conveyor comprises a rotary turret and said receiving means constitute pockets provided in and extending substantially radially of said turret.

5. The machine of claim 4, wherein the inlets of said pockets are located at the periphery of said turret.

6. The machine of claim 1, wherein the advancing means of said feeding means is arranged to advance stacks of sheets along a substantially horizontal path.

7. The machine of claim 1, wherein said conveyor has an odd number of receiving means.

8. The machine of claim 7, wherein each of said steps equals 2*a* and a is the distance between the centers of inlets of two neighboring receiving means.

9. The machine of claim 7, wherein each of said steps equals 3*a* and a is the distance between the centers of inlets of two neighboring receiving means.

10. The machine of claim 1, wherein said conveyor has an even number of receiving means.

11. The machine of claim 10, wherein each of said steps equals 3*a* and a is the distance between the centers of inlets of two neighboring receiving means.

12. The machine of claim 1, wherein said treating means comprises at least one treating device disposed downstream of said second portion but upstream of said first portion of said path, as considered in said predetermined direction.

13. The machine of claim 1, wherein said treating means includes at least one treating device disposed downstream of said first portion but upstream of said second portion of said path, as considered in said predetermined direction.

14. The machine of claim 13, wherein said one treating device includes means for aligning the sheets of each stack prior to the application of adhesive to one edge face of such stack.

15. The machine of claim 14, wherein said one treating device is disposed at a level below said feeding means.

16. The machine of claim 1, wherein said treating means includes an adhesive applying device disposed downstream of said second portion but upstream of said first portion of said path, as considered in said predetermined direction.

17. The machine of claim 16, wherein said adhesive applying device is disposed at a level above said removing means.

18. The machine of claim 1, wherein said treating means includes an adhesive applying device having means for coating one edge face of the stack in the adjacent receiving means of said conveyor and a device for applying strips of flexible material to the adhesive-coated edge faces of stacks, said strip applying device being disposed downstream of said adhesive applying device, as considered in said predetermined direction.

19. The machine of claim 18, wherein said treating means further comprises a folding device having means for converting the applied strips into substantially U-shaped bodies.

20. The machine of claim 19, wherein said folding device is located downstream of said strip applying device and upstream of said feeding means, as considered in said predetermined direction.

21. The machine of claim 19, wherein said strip applying and folding devices are disposed downstream of said removing means but upstream of said feeding means, as considered in said predetermined direction.

22. The machine of claim 1, wherein said conveyor comprises a turret which is rotatable about a substantially horizontal axis, and further comprising means for releasably holding stacks of sheets in the receiving means of said conveyor.

23. The machine of claim 22, wherein said receiving means are substantially radially extending pockets provided in said turret and said holding means comprises a mobile gripping jaw for each of said pockets.

24. The machine of claim 1, wherein said feeding and receiving means are disposed at different levels and said portions of said path are located substantially diametrically opposite one another with reference to the axis of rotation of said conveyor.

25. The machine of claim 1, wherein said removing means includes means for transferring pads from the receiving means of said conveyor.

* * * * *